(12) United States Patent
Uetani et al.

(10) Patent No.: US 8,492,027 B2
(45) Date of Patent: Jul. 23, 2013

(54) LITHIUM SECONDARY BATTERY AND ANODE THEREFOR

(75) Inventors: Yoshihiro Uetani, Osaka (JP); Yuki Kajisa, Osaka (JP); Yasushi Tamura, Osaka (JP)

(73) Assignee: Nitto Denko Corporation, Ibaraki-shi (JP)

( * ) Notice: Subject to any disclaimer, the term of this patent is extended or adjusted under 35 U.S.C. 154(b) by 43 days.

(21) Appl. No.: 13/231,589

(22) Filed: Sep. 13, 2011

(65) Prior Publication Data

US 2012/0070734 A1 Mar. 22, 2012

(30) Foreign Application Priority Data

Sep. 17, 2010 (JP) .................................. 2010-209894

(51) Int. Cl.
*H01M 4/02* (2006.01)

(52) U.S. Cl.
USPC ........... 429/209; 429/122; 429/211; 429/239; 429/231.95; 429/224

(58) Field of Classification Search
USPC .................... 429/209, 224, 229, 231.95, 338, 429/122, 211, 239
See application file for complete search history.

(56) References Cited

U.S. PATENT DOCUMENTS

| | | | |
|---|---|---|---|
| 2005/0058906 A1* | 3/2005 | Sugiyama et al. | 429/231.95 |
| 2008/0020271 A1* | 1/2008 | Sato et al. | 429/129 |
| 2008/0274407 A1* | 11/2008 | Bourcier et al. | 429/231.8 |
| 2010/0167111 A1* | 7/2010 | Sumihara et al. | 429/94 |

FOREIGN PATENT DOCUMENTS

| | | |
|---|---|---|
| EP | 2007-250510 A | 9/2007 |
| EP | 2009-283248 A | 12/2009 |
| JP | 11-233116 A | 8/1999 |
| JP | 2004-103474 A | 4/2004 |

OTHER PUBLICATIONS

JP 2007-250510 translation.*
JP,2004-103474,A translation.*
European Patent Office, European Search Report in European Patent Application No. EP 11 181 491.9 (Nov. 14, 2011).
European Patent Office, European Search Opinion in European Patent Application No. EP 11 181 491.9 (Nov. 14, 2011).

* cited by examiner

*Primary Examiner* — Patrick Ryan
*Assistant Examiner* — Alex Usyatinsky
(74) *Attorney, Agent, or Firm* — Leydig, Voit & Mayer, Ltd.

(57) ABSTRACT

The present invention provides an anode of a lithium secondary battery comprising a current collector layer and an active material layer laminated on the current collector layer, wherein the current collector layer has a laminar structure without an opening, the active material layer has a network structure with an opening, and the shape of the opening in a planar view is a substantially regular polygon of pentagon or above and/or a substantial circle. The anode of the present invention can achieve charge-discharge-cycle property superior to that of the prior art.

3 Claims, 7 Drawing Sheets

LITHIUM SECONDARY BATTERY AND ANODE THEREFOR

TECHNICAL FIELD

The present invention relates to a lithium secondary battery and an anode thereof. The present invention also relates to a sheet useful for producing an anode of a lithium secondary battery (i.e., sheet for anode of lithium secondary battery).

BACKGROUND ART

An anode of a lithium secondary battery comprises a current collector (for example, copper foil) and an active material layer (for example, carbon, tin alloy and the like) laminated on the current collector. In this lithium secondary battery, expansion/contraction of the active material layer occurs since lithium enters and exits the active material layer during charge and discharge. In addition, the active material layer gets broken due to the stress produced by the expansion/contraction. As a result, the charge and discharge capacity of the lithium secondary battery decreases after many repeats of charge and discharge cycle.

Patent document 1 describes configuration of a void (opening) with a given pattern in an active material layer to alleviate the above-mentioned stress. As specific shape of the active material layer, a stripe-shape (shape of opening: stripe-shape), a grid-shape (shape of opening: square) and a square dot-shape (shape of opening: grid-shape) are described (particularly, patent document 1, FIG. 3).

In patent document 2, configuration of a void (opening) in a current collector itself in an attempt to alleviate the above-mentioned stress and prevent fracture of a current collector is described (particularly, patent document 2, FIG. 1).

DOCUMENT LIST

Patent Documents patent document 1: JP-A-2004-103474
patent document 2: JP-A-11-233116

SUMMARY OF THE INVENTION

Problems to be Solved by the Invention

In the anode proposed in the prior art (e.g., patent document 1), the performance to prevent decrease of the charge and discharge capacity due to repeated charge and discharge cycle (hereinafter abbreviated as "charge-discharge-cycle property") is not sufficient. It is therefore an object of the present invention to provide an anode of a lithium secondary battery, which can achieve a charge-discharge-cycle property superior to that of the prior art.

Means of Solving the Problems

The present inventors have conducted intensive studies in an attempt to achieve the above-mentioned object and completed the following invention.
[1] An anode of a lithium secondary battery comprising a current collector layer and an active material layer laminated on the current collector layer, wherein
the current collector layer has a laminar structure without an opening,
the active material layer has a network structure with an opening, and
the shape of the opening in a planar view is a substantially regular polygon of pentagon or above and/or a substantial circle.
[2] The anode of the above-mentioned [1], wherein the substantially regular polygon is a substantially regular hexagon.
[3] A lithium secondary battery comprising the anode of the above-mentioned [1] or [2].
[4] A sheet for an anode of a lithium secondary battery comprising a current collector layer and an active material layer laminated on the current collector layer, wherein
the current collector layer has a laminar structure without an opening,
the active material layer has a network structure with an opening, and
the shape of the opening in a planar view is a substantially regular polygon of pentagon or above and/or a substantial circle.

In the present invention, the "opening of the active material layer" means a part free of an active material, and the "shape of the opening in a planar view" means a shape of the opening when the active material layer is seen from the perpendicular direction. Moreover, a "network structure having an opening" in the active material layer means that, when the active material layer is seen from the perpendicular direction, plural openings are regularly aligned, and the periphery of the individual openings form a part covering the current collector layer (part where active material is present).

Effect of the Invention

Using the anode of the present invention, a lithium secondary battery superior in the charge-discharge-cycle property can be produced.

DESCRIPTION OF EMBODIMENTS

The present invention relates to an anode of a lithium secondary battery and a sheet for the anode.

In the present invention, "a sheet for an anode of a lithium secondary battery" is a sheet used for producing "an anode of a lithium secondary battery", and "an anode of a lithium secondary battery" can be produced by cutting or punching out a sheet in a desired size.

In the following description, therefore, "anode" is used to show a concept encompassing an anode of a lithium secondary battery and a sheet for the anode, unless particularly specified.

Figure 1:
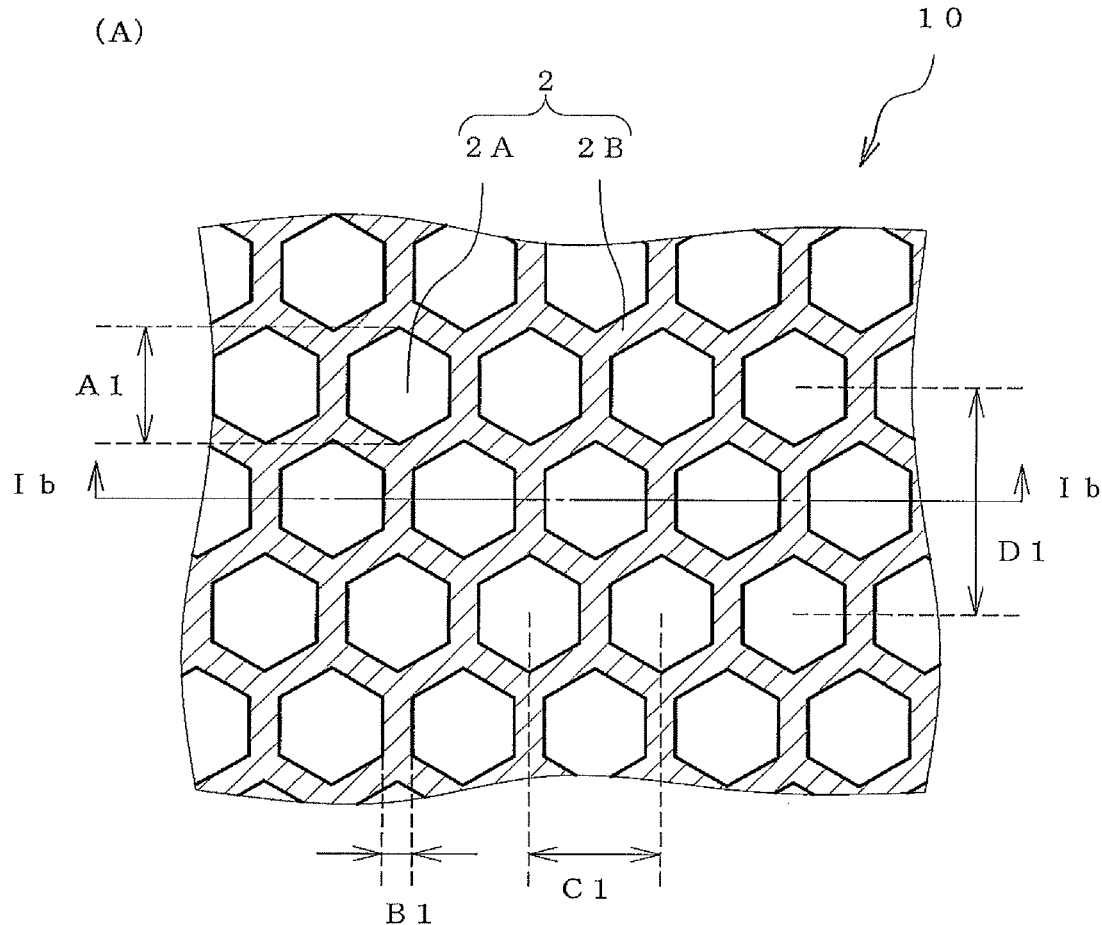
FIG. 1 (A) is a schematic plane view of the main part of the anode of the lithium secondary battery in the first specific example of the present invention, and FIG. 1 (B) is a schematic sectional view along the line Ib-Ib of FIG. 1 (A).
Figure 1:
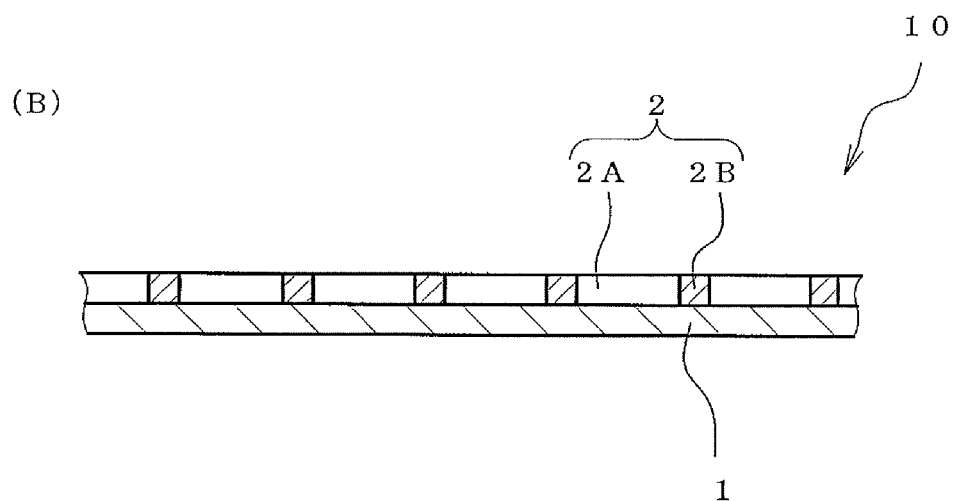
Figure 2:
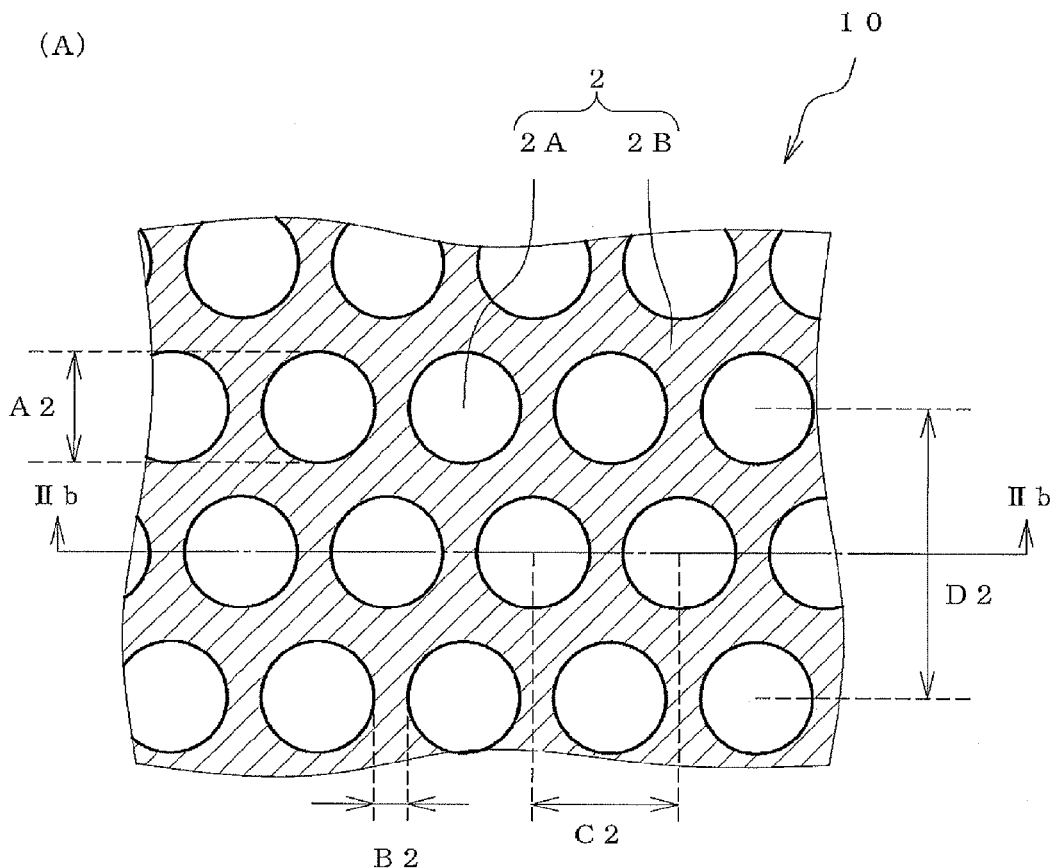
FIG. 2 (A) is a schematic plane view of the main part of the anode of the lithium secondary battery in the second specific example of the present invention, and FIG. 2 (B) is a schematic sectional view along the line IIb-IIb of FIG. 2 (A).
Figure 2:
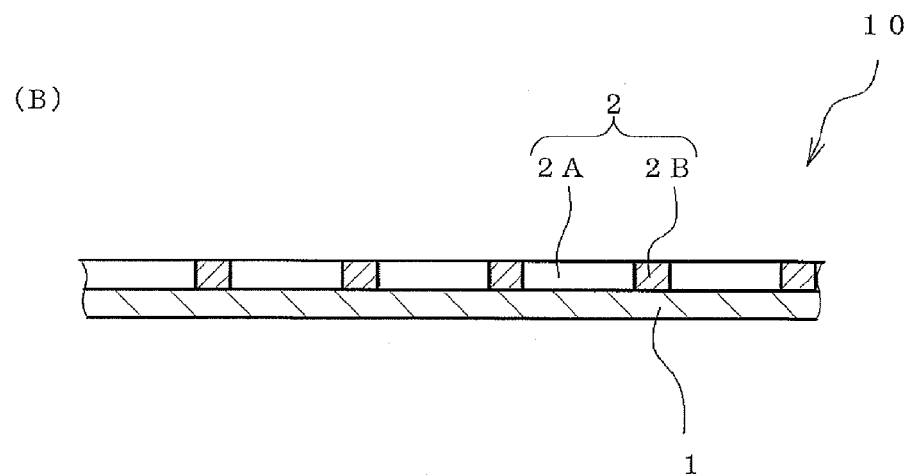

FIG. 1 is a schematic plane view of the main part of the anode of the lithium secondary battery in the first specific example of the present invention (FIG. 1 (A)) and a schematic sectional view thereof (FIG. 1 (B)), FIG. 2 is a schematic plane view of the main part of the anode of the lithium secondary battery in the second specific example of the present invention (FIG. 2 (A)) and a schematic sectional view thereof (FIG. 2 (B)). FIG. 1 (B) shows a sectional view along the line Ib-Ib in FIG. 1 (A), and FIG. 2 (B) shows a sectional view along the line IIb-IIb in FIG. 2 (A).

As shown in anode 10 in FIG. 1 and FIG. 2, the anode of the present invention comprises a current collector layer 1 and an active material layer 2 laminated on the current collector layer 1. An active material layer 2 may be formed on one surface of a current collector layer, or may be formed on both surfaces of the current collector layer.

In the anode of the present invention, the current collector layer 1 does not have an opening. As a result, the current collector layer 1 can maintain its electrical resistance at a low level as well as sufficient intensity. The current collector layer 1 can be generally formed from an electrically conductive metal or alloy. Preferred is a metal foil or alloy foil, more preferred is a copper foil, and still more preferred is an electrolytic copper foil.

When the current collector layer 1 is too thin, the internal resistance of a battery becomes high, and the load characteristic of the battery becomes low. On the other hand, when the current collector layer is too thick, the volume and weight of the battery increase and the energy density decreases. Thus, the thickness of the current collector layer is preferably not less than 1 μm, more preferably not less than 5 μm, still more preferably not less than 8 μm, and preferably not more than 50 μm, more preferably not more than 30 μm, still more preferably not more than 20 μm.

In the active material layer 2, a network structure has an opening 2A. That is, when the active material layer 2 is seen from the perpendicular direction, plural openings 2A are regularly aligned, and the periphery of the individual openings 2A are covering parts 2B covering the current collector layer 1. Typically, the regular alignment of the openings 2A in the network structure is zigzag alignment, matrix alignment and the like, with preference given to zigzag alignment. In FIG. 1 (A) and FIG. 2 (A), openings 2A are aligned in a zigzag manner.

In the anode of the present invention, the shape of the opening in the active material layer in a planar view is a substantially regular polygon of pentagon or above and/or a substantial circle.

In the present invention, the "substantially regular polygon" means a polygon wherein the length of the longest side is not more than 1.1 times the length of the shortest side, and includes, besides regular polygons, polygons similar to regular polygons. The length of the longest side of a substantially regular polygon is preferably not more than 1.05 times the length of the shortest side, and the substantially regular polygon is more preferably a regular polygon. The "substantial circle" means an ellipse or oval wherein the major axis thereof (long axis) is not more than 1.1 times the length of the minor axis (short axis), and includes circles. The major axis of the substantial circle is preferably not more than 1.05 times the length of the minor axis, and the substantial circle is more preferably a circle. In FIG. 1 (A), the shape of the opening 2A is a regular hexagon, and in FIG. 2 (A), the shape of the opening 2A is a circle.

When the opening in the active material layer is a substantially regular polygon of pentagon or above and/or a substantial circle (the following Examples 1-12), the charge-discharge-cycle property of the lithium secondary battery can be improved, as compared to when the opening is square as described in patent document 1 (following Comparative Examples 2 and 3). While the mechanism thereof is not certain, it is assumed since a substantially regular polygon of pentagon or above has more corners than do squares (rectangles), at which the stress is considered to concentrate, the concentration of stress is reduced, and particularly, the breakage of the active material layer is further prevented. The substantial circle can be considered to have an infinitely increasing number of corners of the substantially regular polygon, and therefore, even a substantial circle is considered to reduce the stress concentration. However, the present invention is not limited to the presumed mechanism. The substantially regular polygon of pentagon or above is preferably a substantially regular hexagon and/or substantially regular octagon, more preferably substantially regular hexagon.

The shape of the opening in the active material layer is preferably at least one selected from the group consisting of a substantially regular hexagon, a substantially regular octagon and a substantial circle, more preferably a substantially regular hexagon (particularly a regular hexagon) and/or a substantial circle (particularly a circle). The shape of the opening is more preferably a substantially regular hexagon (particularly a regular hexagon). When the opening of the active material layer is a substantial circle, as shown in FIG. 2 (A), the width of the covering part 2B on the periphery of opening 2A is not uniform, including a wide part and a narrow part. When the opening is a substantially regular hexagon, as shown in FIG. 1 (A), the width of the covering part 2B on the periphery of opening 2A is almost uniform, which enables formation of an active material layer 2 having superior intensity.

It is preferable that the shape of the opening in the active material layer be basically a single shape (namely, plural openings have the same shape). However, two or more kinds of openings having different shapes may also be present. For example, an opening of a substantially regular hexagon and an opening of a substantial circle may be present, and an opening of a substantially regular hexagon and an opening of a substantially regular octagon may be present.

When the size of the opening in the active material layer is too small, the stress due to expansion/contraction of the active material layer cannot be alleviated sufficiently. When the size of the opening is too large, charge and discharge capacity of a lithium secondary battery becomes too small. The longest distance across the corners of the opening, which is a substantially regular polygon (A1 in FIG. 1 (A)), is preferably not less than 1 μm, more preferably not less than 50 μm, still more preferably not less than 100 μm, and preferably not more than 1000 µm, more preferably not more than 900 µm, more preferably not more than 800 µm. In addition, the diameter or long axis (A2 in FIG. 2 (A)) of the opening, which is a substantial circle, is preferably not less than 1 µm, more preferably not less than 50 µm, still more preferably not less than 100 µm, and preferably not more than 1000 µm, more preferably not more than 900 µm, still more preferably not more than 800 µm.

While the size of each opening in the active material layer may be different, the active material layer preferably has uniform property in the entirety thereof. Thus, the maximum length (maximum distance across corners, or diameter or long axis) of the maximum opening in the active material layer is preferably not more than 2.0 times, more preferably not more than 1.5 times, the maximum length (maximum distance across corners, or diameter or long axis) of the minimum opening, wherein each opening more preferably has substantially the same size. That "each opening has substantially the same size" means the difference in the size of each opening is within the range of production error. In actual production, even if the openings are set to the same size, the size dispersion may occur due to a production error.

When the minimum width of the covering part of the active material layer is too small, the active material layer does not adhere sufficiently to the current collector layer, and the active material may drop off after repeated charge and discharge cycles. On the other hand, when the minimum width of the covering part is too large, the stress caused by expansion/contraction of the active material layer cannot be reduced sufficiently. Therefore, the minimum width of the covering part is preferably not less than 1 µm, more preferably not less than 10 µm, still more preferably not less than 20 µm, and preferably not more than 500 µm, more preferably not more than 300 µm, still more preferably not more than 100 µm. Here, "the minimum width of the covering part" means the smallest distance between adjacent two openings (e.g., B1 in FIG. 1 (A), B2 in FIG. 2 (A)).

When, in the active material layer, the area ratio of the covering part relative to the total area including opening and covering part (hereinafter sometimes to be abbreviated as "covering rate") is too small, the charge and discharge capacity of the lithium secondary battery becomes too small. On the other hand, when it is too high, the stress caused by expansion/contraction of the active material layer cannot be reduced sufficiently. Hence, the covering rate is preferably not less than 5 area %, more preferably not less than 10 area %, more preferably not less than 15 area %, and preferably not more than 70 area %, more preferably not more than 65 area %, more preferably not more than 60 area %.

When the active material layer is too thin, the charge and discharge capacity of the lithium secondary battery becomes too small. On the other hand, when it is too thick, the stress caused by expansion/contraction of the active material layer cannot be reduced sufficiently. Thus, the thickness of the active material layer (i.e., thickness of covering part) is preferably not less than 1 µm, more preferably not less than 3 µm, still more preferably not less than 5 µm, and preferably not more than 100 µm, more preferably not more than 80 µm, still more preferably not more than 60 µm.

As an active material, a simple substance, oxide, alloy or eutectoid of tin, or a mixture thereof, or a simple substance, oxide, alloy or eutectoid of silicon, or a mixture thereof is preferable. Examples of the elements other than tin and silicon to be contained in the aforementioned alloy or eutectoid include copper, silver, bismuth, nickel, zinc, aluminum, iron and germanium and the like. Of these, copper is preferable.

The amount of the elements other tin and silicon to be contained in the total active material of a lithium secondary battery to secure sufficient charge and discharge capacity is preferably not more than 50 wt %, more preferably not more than 40 wt %, still more preferably not more than 30 wt %. Tin alloy or eutectoid may contain silicon, and silicon alloy or eutectoid may contain tin.

The sheet for anode of the present invention can be produced by forming an active material layer, having openings formed by a known pattern formation method, on a current collector layer. For example, a resist film having openings and covering parts with shapes reverse to those of the active material layer is formed on a current collector layer by photolithography, an active material layer is formed thereon by electroplating, electroless plating, sputtering, vapor deposition, coating or printing and the like, and then, the resist film is removed to form openings of the active material layer, whereby a sheet for anode can be produced. An active material layer having openings formed in a given pattern can also be produced by pattern coating or masking coating using a coating composition containing an active material.

The anode of the present invention can be produced by cutting or punching out a sheet for anode produced as mentioned above to a desired size by a known means.

The present invention further provides a lithium secondary battery containing the above-mentioned anode. The lithium secondary battery of the present invention characteristically contains the above-mentioned anode, and other constitution is not particularly limited. The constitution of the lithium secondary battery and the production method thereof are known and are described, for example, in patent documents 1 and 2 and the like.

EXAMPLES

The present invention is explained in more detail in the following by referring to Examples. However, the present invention is not limited to the following Examples, and can be practiced by making appropriate modifications and changes without substantially departing from the above or below-mentioned teaching and advantages of the present invention, all of which are encompassed in the technical scope of the present invention.

Examples 1-5

Figure 3:
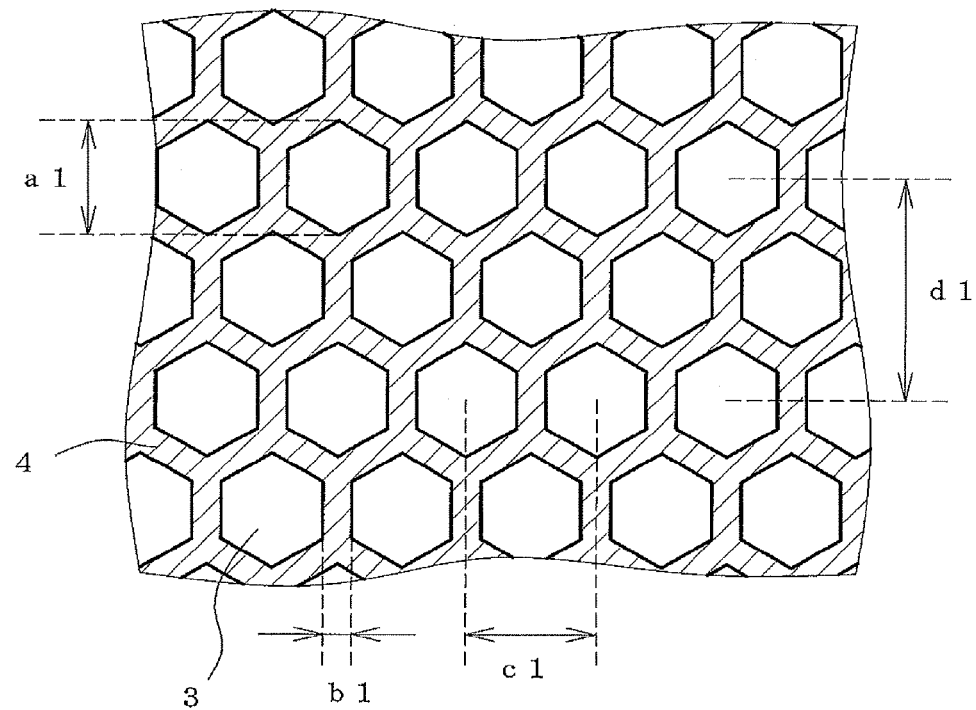
FIG. 3 is a schematic plane view of the photomask used in Examples 1-9.

Production of Sheet for Anode, Having Active Material Layer with Regular Hexagon Openings A negative resist film (thickness: 25 µm) was laminated on an electrolytic copper foil (thickness: 20 µm). Using a photomask of the shape and size shown in FIG. 3 and Table 1 (in FIG. 3, symbol 3 shows a translucent part, and symbol 4 shows a light shielding part), the resist film was exposed and developed to form a developed resist film (shape of covering part: regular hexagon) with a pattern inverted to the photomask. The electrolytic copper foil having the developed resist film was immersed in a plating solution (aqueous solution containing tin(II) methanesulfonate: 39 g/L, copper(II) methanesulfonate: 6.6 g/L, methanesulfonic acid: 100 g/L, bisphenol: 5 g/L, thiourea: 10 g/L, catechol 1 g/L), and electroplating was carried out to form an Sn—Cu eutectoid plated layer (thickness: 10 µm) on the electrolytic copper foil. The electroplating was carried out while adjusting the temperature of the plating solution to 30° C. and stirring with a stirrer for 20 min at current density of 1 A/dm$^2$. The electrolytic copper foil having the Sn—Cu eutectoid plated layer was washed with water, and the developed resist film was detached with 3-5 wt % NaOH aqueous solution and further washed with water to give an electrolytic copper foil (current collector layer) having the Sn—Cu eutectoid plated layer (active material layer), wherein regular hexagon openings were aligned in a zigzag manner; that is, a sheet for anode having an active material layer with the network structure shown in FIG. 1 (A) was produced. The size and covering rate of each part (A1, B1, C1 and D1 in FIG. 1 (A)) of the active material layer, and the amount of Cu in the active material layer are shown in the following Table 1. The size of each part of the active material layer was calculated from an electron micrograph taken by an electron microscope: "JSM-6390A" manufactured by JEOL, and the amount of Cu in the active material layer was measured by EDX (energy dispersive X-ray spectroscopy).

Figure 9:
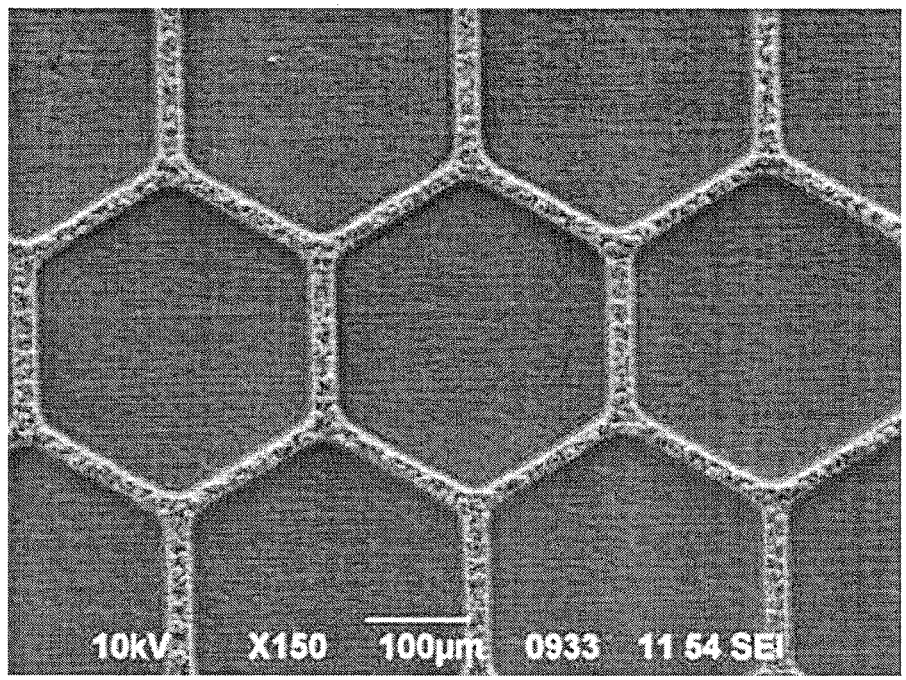
FIG. 9 is an electron micrograph of the sheet for anode produced in Example 1 (shape of opening in active material layer: regular hexagon).

In addition, the electron micrograph of the sheet for anode, produced in Example 1, is shown in FIG. 9.

Examples 6-9

Production of Sheet for Anode Having Active Material Layer with Regular Hexagon Openings In the same manner as in Example 2 except that the concentration of copper(II) methanesulfonate in the plating solution was changed to 0 (Example 6), 3.3 g/L (Example 7), 5.0 g/L (Example 8) or 6.6 g/L (Example 9), an electrolytic copper foil (current collector layer, thickness: 20 µm) having an Sn plated layer or Sn—Cu eutectoid plated layer (active material layer, thickness: 10 µm), wherein regular hexagon openings were aligned in a zigzag manner; that is, a sheet for anode having an active material layer with a network structure shown in FIG. 1 (A), was produced. The size and covering rate of each part (A1, B1, C1 and D1 in FIG. 1 (A)) of the active material layer, and the amount of Cu in the active material layer are shown in the following Table 1.

Examples 10-12

Figure 4:
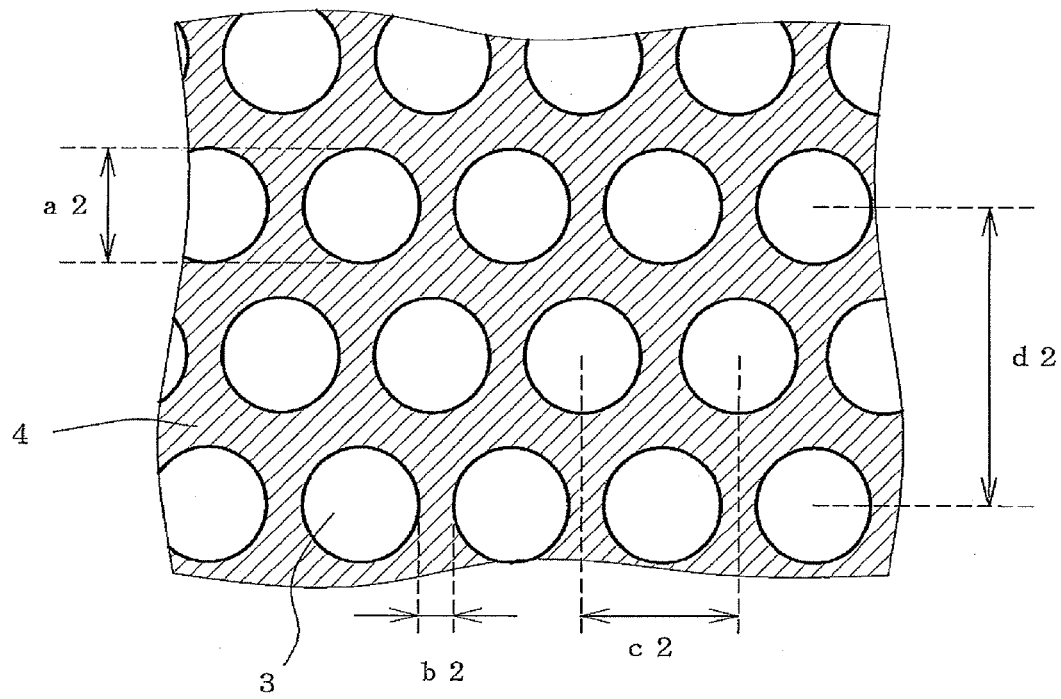
FIG. 4 is a schematic plane view of the photomask used in Examples 10-12.

Production of Sheet for Anode Having Active Material Layer with Circular Openings In the same manner as in Examples 1-5 except that a photomask of the shape and size shown in FIG. 4 and Table 2 (in FIG. 4, symbol 3 shows a translucent part, and symbol 4 shows a light shielding part) was used, an electrolytic copper foil (current collector layer, thickness: 20 µm) having an Sn—Cu eutectoid plated layer (active material layer, thickness: 10 µm), wherein circle openings were aligned in a zigzag manner; that is, a sheet for an anode having an active material layer with a network structure shown in FIG. 2 (A), was produced. The size and covering rate of each part (A2, B2, C2 and D2 in FIG. 2 (A)) of the active material layer, and the amount of Cu in the active material layer are shown in the following Table 2.

Figure 10:
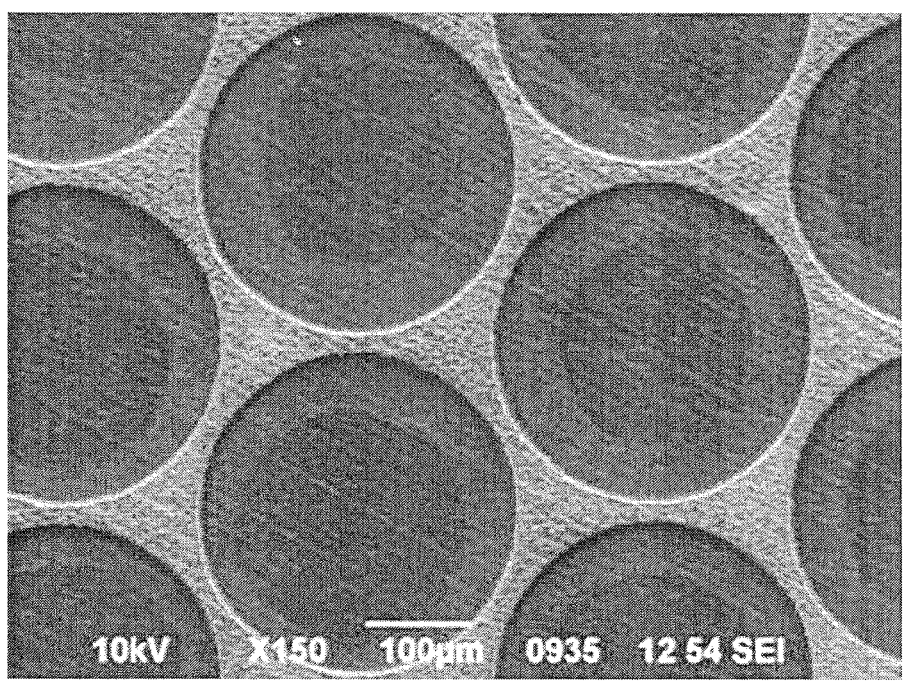
FIG. 10 is an electron micrograph of the sheet for anode produced in Example 10 (shape of opening in active material layer: circle).

In addition, an electron micrograph of the sheet for anode, produced in Example 10, is shown in FIG. 10.

Comparative Example 1

Figure 5:
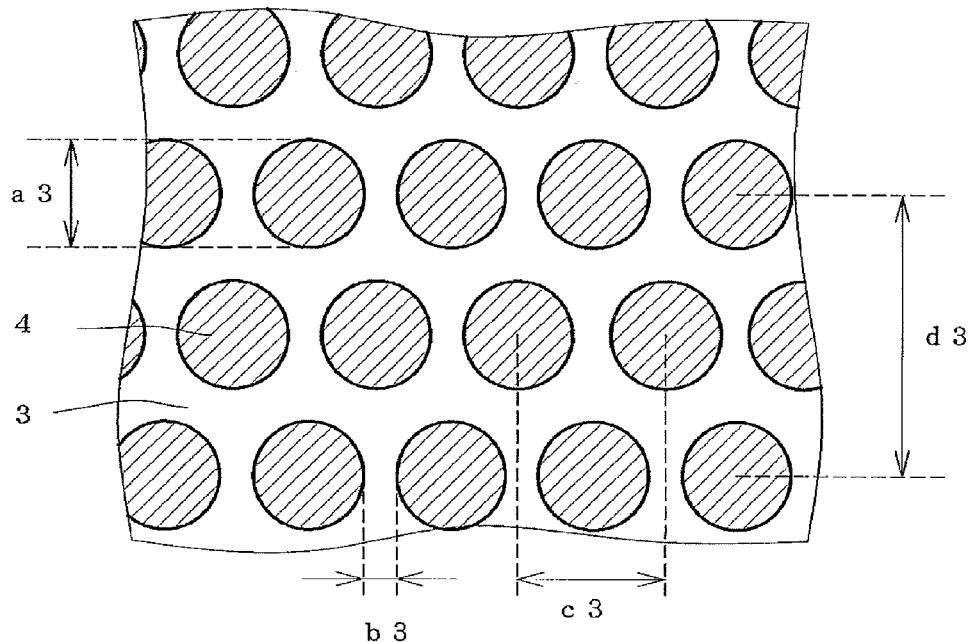
FIG. 5 is a schematic plane view of the photomask used in Comparative Example 1.
Figure 6:
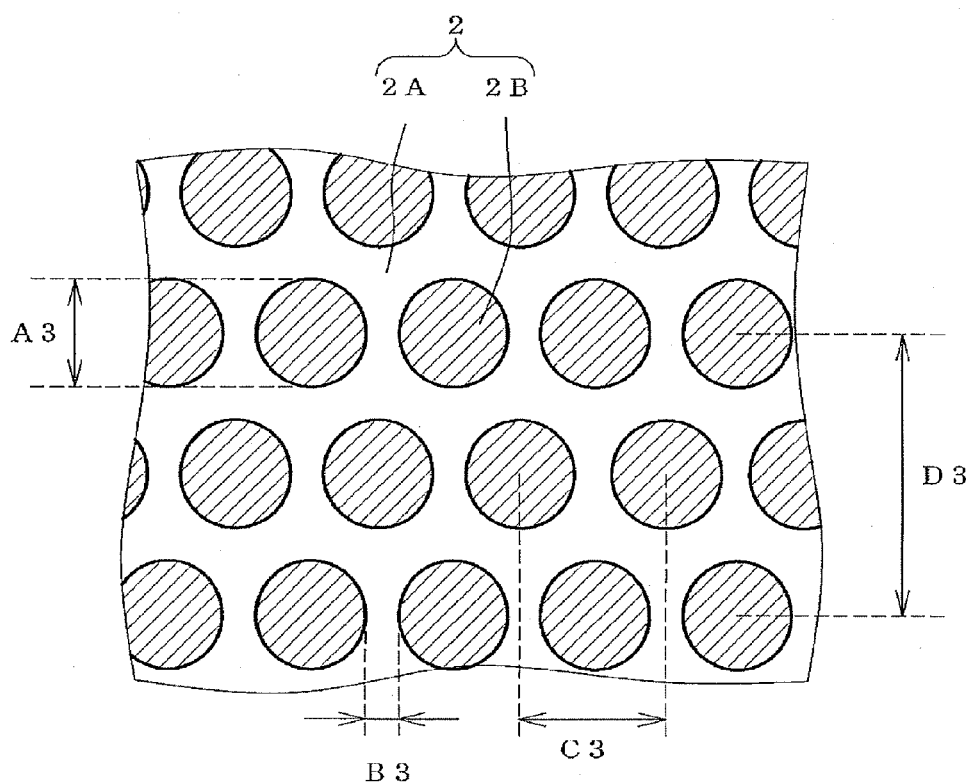
FIG. 6 is a schematic plane view of the main part of the sheet for anode produced in Comparative Example 1.

Production of Sheet for Anode Having Active Material Layer with Circular Covering Parts In the same manner as in Examples 1-5 except that a photomask of the shape and size shown in FIG. 5 and Table 3 (in FIG. 5, symbol 3 shows a translucent part, and symbol 4 shows a light shielding part) was used, an electrolytic copper foil (current collector layer, thickness: 20 µm) having an Sn—Cu eutectoid plated layer (active material layer, thickness: 10 µm); that is, a sheet for anode, was produced. FIG. 6 is a schematic plane view of the main part of the sheet for anode. In the sheet for anode, the circular covering part 2B is aligned in a zigzag manner, and the periphery of each covering part 2B is an opening 2A. The size and covering rate of each part (A3, B3, C3 and D3 in FIG. 6) of the active material layer, and the amount of Cu in the active material layer are shown in Table 3.

Figure 11:
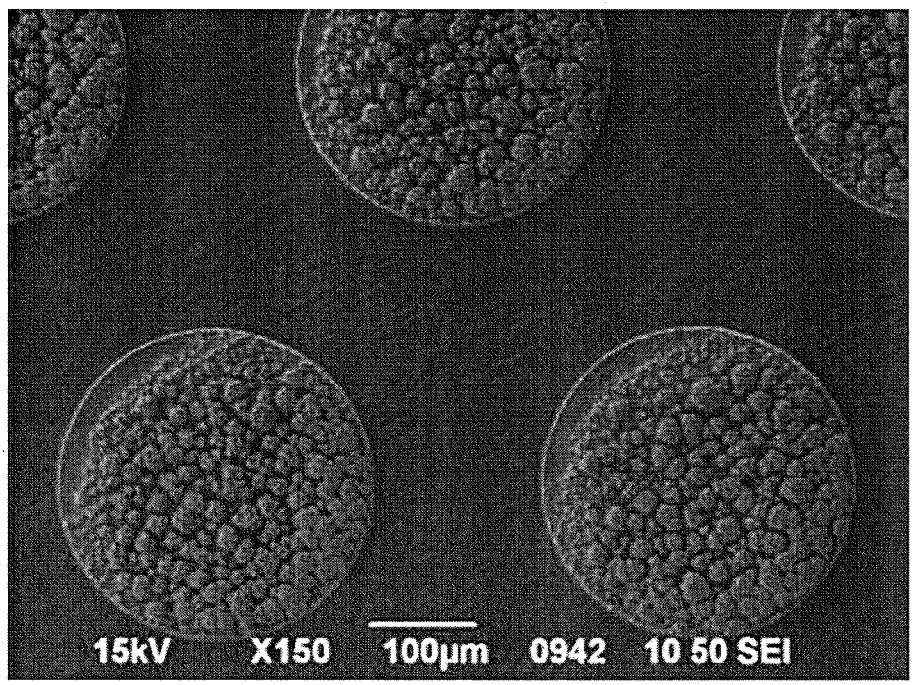
FIG. 11 is an electron micrograph of the sheet for anode produced in Comparative Example 1 (shape of covering part in active material layer: circle).

In addition, an electron micrograph of the sheet for anode, produced in Comparative Example 1, is shown in FIG. 11.

Comparative Examples 2 and 3

Production of Sheet for Anode Having Active Material Layer with Square Openings

Figure 7:
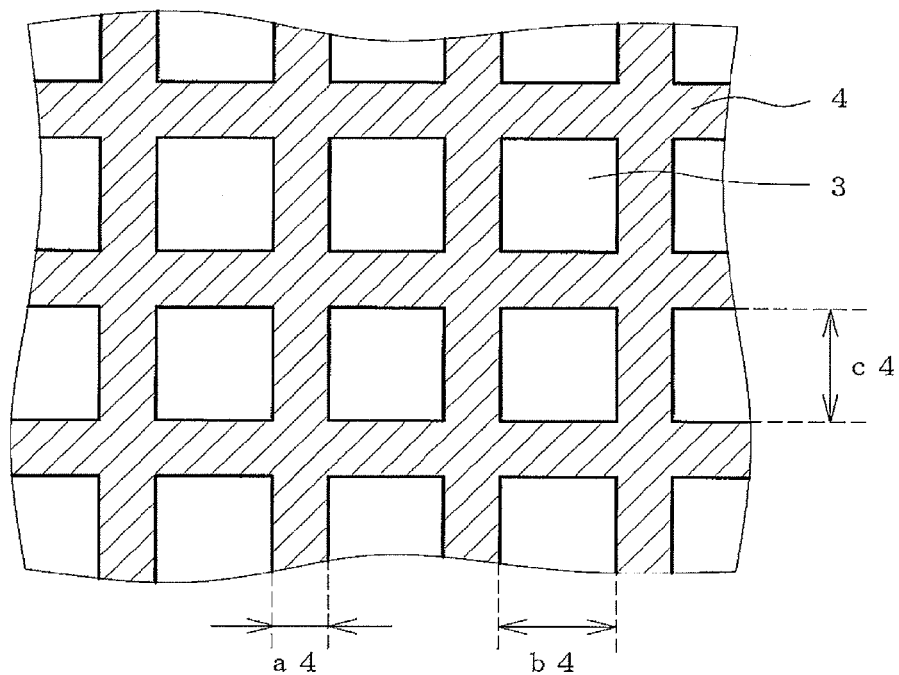
FIG. 7 is a schematic plane view of the photomask used in Comparative Examples 2 and 3.
Figure 8:
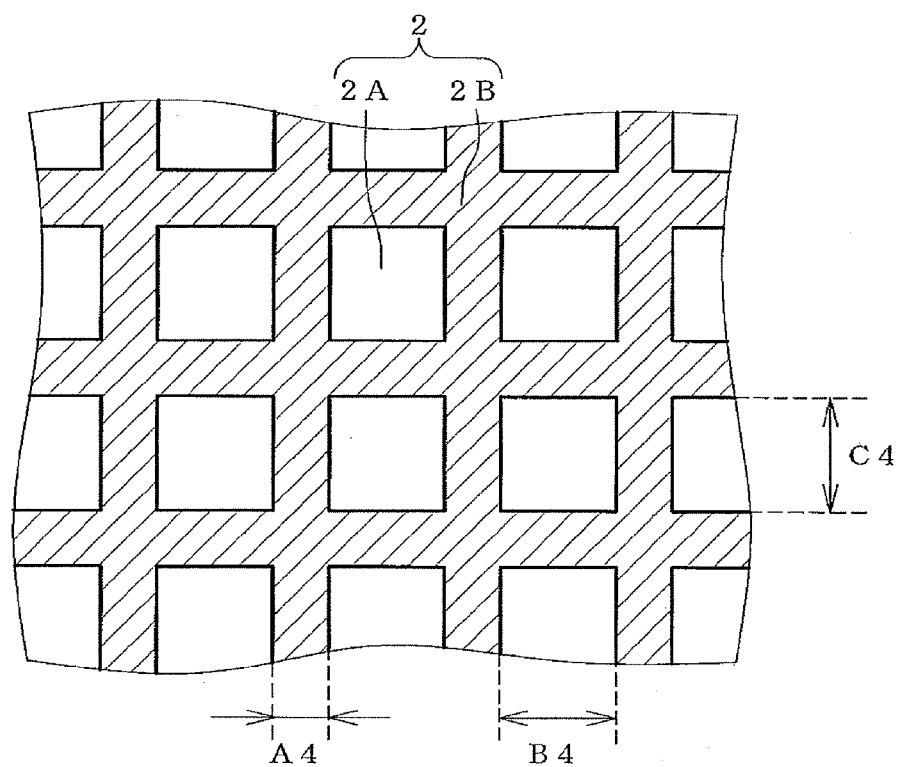
FIG. 8 is a schematic plane view of the main part of the sheet for anode produced in Comparative Examples 2 and 3.

In the same manner as in Examples 1-5 except that a photomask of the shape and size shown in FIG. 7 and Table 4 (in FIG. 7, symbol 3 shows a translucent part, and symbol 4 shows a light shielding part.) was used, an electrolytic copper foil (current collector layer, thickness: 20 µm) having an Sn—Cu eutectoid plated layer (active material layer, thickness: 10 µm); that is, a sheet for anode, was produced. FIG. 8 is a schematic plane view of the main part of the sheet for anode. In the sheet for anode, square openings 2A are aligned in a matrix. The size and covering rate of each part (A4, B4 and C4 in FIG. 8) of the active material layer, and the amount of Cu in the active material layer are shown in Table 4.

Figure 12:
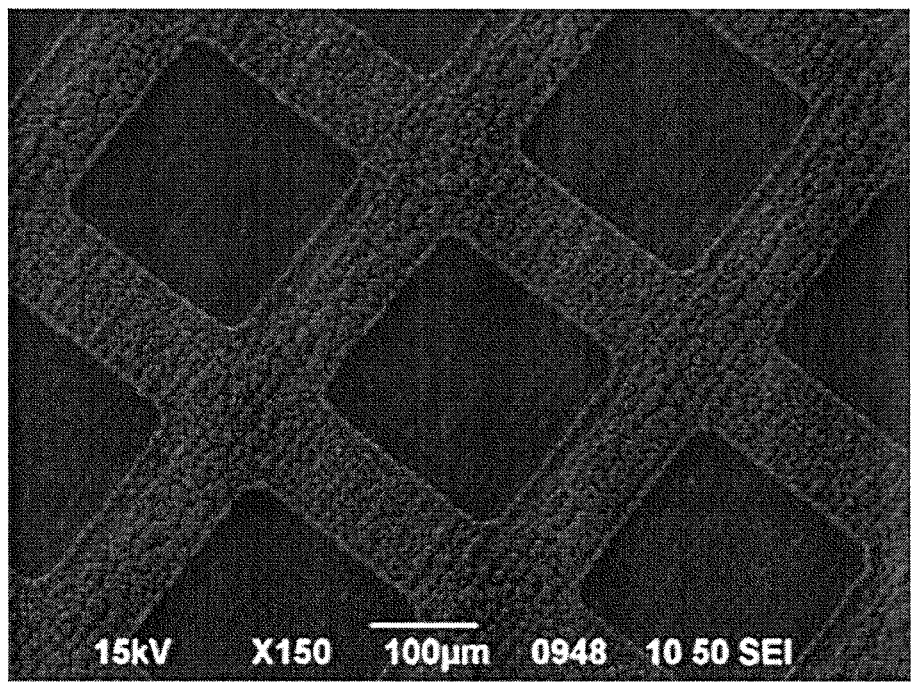
FIG. 12 is an electron micrograph of the sheet for anode produced in Comparative Example 2 (shape of opening in active material layer: square).

In addition, an electron micrograph of the sheet for anode, produced in Comparative Example 2, is shown in FIG. 12.

Comparative Example 4

Production of Sheet for Anode Having Active Material Layer with No Opening

In the same manner as in Examples 1-5 except that an Sn—Cu eutectoid plated layer was formed on the whole area of the electrolytic copper foil, without using a negative resist film, an electrolytic copper foil (current collector layer, thickness: 20 µm) having an Sn—Cu eutectoid plated layer (active material layer, opening: none, thickness: 10 µm); that is, a sheet for anode, was produced. The Cu amount of the active material layer and the like are shown in the following Table 5.

Evaluation of Charge-Discharge-Cycle Property (1) Production of Battery

The sheets for anode produced in Examples 1-12 and Comparative Examples 1-4 were punched out in 16 mmφ in size, and anodes for evaluation were prepared. The anodes were dried at 70° C. for 1 hr under vacuum, and transferred into a glove box under an argon atmosphere. Under an argon atmosphere in the glove box, a 2016 size-coin cell type battery was produced using the anode. As the counter electrode (cathode) of the battery, a metal lithium punched out in 15 mmφ was used. As a separator, a fine porous film made of polyethylene (thickness: 25 µm, porosity: 40% by volume, average diameter of void: 0.1 µm) was used and, as an electrolytic solution, a 1.4M LiPF$_6$ solution (solvent: ethylene carbonate (EC) and diethylcarbonate (DEC), volume ratio of EC:DEC=1:2) was used.

(2) Charge and Discharge Cycle Test

The battery produced as mentioned above was placed in a thermostat at 25° C., and 10 charge and discharge cycles within the range of 0.1-2.5 V were repeated at a charge-discharge rate of 0.1 CmA. The discharged capacity at the first cycle and the discharged capacity at the 10th cycle were measured. As relative discharged capacity, the relative value of the discharged capacity at the 10th cycle to that at the first cycle as 100 was calculated. The results of the relative discharged capacity are shown in Tables 1-5.

TABLE 1

Shape of opening in active material layer: regular hexagon

| Example | size of photomask (mm) | | | | size of active material layer (mm) | | | | covering rate (area %) | Cu amount (wt %) | relative discharged capacity |
| --- | --- | --- | --- | --- | --- | --- | --- | --- | --- | --- | --- |
| | a1 | b1 | c1 | d1 | A1 | B1 | C1 | D1 | | | |
| 1 | 0.3 | 0.03 | 0.29 | 0.50 | 0.29 | 0.029 | 0.28 | 0.48 | 19 | 16.3 | 127 |
| 2 | 0.3 | 0.05 | 0.31 | 0.54 | 0.30 | 0.046 | 0.30 | 0.52 | 29 | 15.4 | 123 |
| 3 | 0.3 | 0.10 | 0.36 | 0.62 | 0.30 | 0.12 | 0.35 | 0.60 | 47 | 13.3 | 129 |
| 4 | 0.1 | 0.03 | 0.12 | 0.20 | 0.12 | 0.025 | 0.11 | 0.20 | 44 | 12.0 | 103 |
| 5 | 0.5 | 0.03 | 0.46 | 0.80 | 0.48 | 0.028 | 0.44 | 0.77 | 12 | 15.2 | 108 |
| 6 | 0.3 | 0.05 | 0.31 | 0.54 | 0.30 | 0.040 | 0.30 | 0.54 | 29 | 0 | 106 |
| 7 | | | | | 0.30 | 0.044 | 0.31 | 0.54 | 29 | 10.1 | 100 |
| 8 | | | | | 0.31 | 0.046 | 0.32 | 0.56 | 29 | 22.8 | 106 |
| 9 | | | | | 0.30 | 0.044 | 0.31 | 0.54 | 29 | 37.7 | 103 |

TABLE 2

Shape of opening in active material layer: circle

| Example | size of photomask (mm) | | | | size of active material layer (mm) | | | | covering rate (area %) | Cu amount (wt %) | relative discharged capacity |
| --- | --- | --- | --- | --- | --- | --- | --- | --- | --- | --- | --- |
| | a2 | b2 | c2 | d2 | A2 | B2 | C2 | D2 | | | |
| 10 | 0.3 | 0.03 | 0.33 | 0.572 | 0.30 | 0.020 | 0.31 | 0.55 | 25 | 14.6 | 113 |
| 11 | 0.3 | 0.05 | 0.35 | 0.606 | 0.29 | 0.030 | 0.34 | 0.58 | 33 | 13.6 | 110 |
| 12 | 0.5 | 0.03 | 0.53 | 0.918 | 0.49 | 0.028 | 0.51 | 0.91 | 19 | 14.1 | 125 |

TABLE 3

Shape of covering part in active material layer: circle

| Comparative Example | size of photomask (mm) | | | | size of active material layer (mm) | | | | covering rate (area %) | Cu amount (wt %) | relative discharged capacity |
| --- | --- | --- | --- | --- | --- | --- | --- | --- | --- | --- | --- |
| | a3 | b3 | c3 | d3 | A3 | B3 | C3 | D3 | | | |
| 1 | 0.3 | 0.15 | 0.45 | 0.779 | 0.30 | 0.16 | 0.46 | 0.78 | 40 | 37.3 | 29 |

TABLE 4

Shape of opening in active material layer: square

| Comparative Example | size of photomask (mm) | | | size of active material layer (mm) | | | covering rate (area %) | Cu amount (wt %) | relative discharged capacity |
| --- | --- | --- | --- | --- | --- | --- | --- | --- | --- |
| | a4 | b4 | c4 | A4 | B4 | C4 | | | |
| 2 | 0.1 | 0.2 | 0.2 | 0.10 | 0.21 | 0.20 | 55 | 33.6 | 55 |
| 3 | 0.1 | 0.5 | 0.5 | 0.10 | 0.50 | 0.50 | 30 | 33.2 | 33 |

TABLE 5

Opening part in active material layer: none

| Comparative Example | covering rate (area %) | Cu amount (wt %) | relative discharged capacity |
| --- | --- | --- | --- |
| 4 | 100 | 20.0 | 6 |

As it is clear from the results of the relative discharged capacity shown in the above-mentioned Tables, using the anode of the present invention having an active material layer with regular hexagon or circular openings, a battery superior in the charge-discharge-cycle property can be produced. Particularly, Example 3 (covering rate: 47%, relative discharged capacity: 129) and Example 4 (covering rate: 44%, relative discharged capacity: 103), both having regular hexagon openings, showed higher relative discharged capacity than Comparative Example 3 with square openings (covering rate: 30%, relative discharged capacity: 33), even though Examples 3 and 4 showed high covering rate as compared to Comparative Example 3, and the stress due to expansion/contraction of the active material layer is considered to be higher.

This application is based on a patent application No. 2010-209894 filed in Japan, the contents of which are incorporated in full herein.

| [Explanation of symbols] | |
|---|---|
| 1 | current collector layer |
| 2 | active material layer |
| 2A | opening |
| 2B | covering part |
| 3 | translucent part |
| 4 | light shielding part |
| 10 | anode |

The invention claimed is:

1. An anode of a lithium secondary battery comprising a current collector layer and an active material layer laminated on the current collector layer, wherein
   the current collector layer has a laminar structure without an opening,
   the active material layer has a honeycomb-shaped network structure with an opening and a covering part,
   the shape of the opening in a planar view is a substantially regular hexagon, and
   the width of the covering part between the adjacent openings is about uniform.

2. A lithium secondary battery comprising the anode according to claim 1.

3. A sheet for an anode of a lithium secondary battery comprising a current collector layer and an active material layer laminated on the current collector layer, wherein
   the current collector layer has a laminar structure without an opening,
   the active material layer has a honeycomb-shaped network structure with an opening and a covering part,
   the shape of the opening in a planar view is a substantially regular hexagon, and
   the width of the covering part between the adjacent openings is about uniform.

* * * * *